United States Patent
Lee et al.

(10) Patent No.: US 8,223,615 B2
(45) Date of Patent: Jul. 17, 2012

(54) COMPATIBLE NEAR FIELD OPTICAL RECORDING/REPRODUCING APPARATUS

(75) Inventors: Jin-kyung Lee, Suwon-si (KR); No-cheol Park, Seoul (KR); Kyung-geun Lee, Seoul (KR); Yong-joong Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 12/560,482

(22) Filed: Sep. 16, 2009

(65) Prior Publication Data

US 2010/0110863 A1     May 6, 2010

(30) Foreign Application Priority Data

Nov. 4, 2008  (KR) .................. 10-2008-0109036

(51) Int. Cl.
G11B 7/00  (2006.01)
G11B 7/135 (2006.01)

(52) U.S. Cl. ......... 369/112.23; 369/112.08; 369/112.13; 369/112.26

(58) Field of Classification Search ............... 369/13.33, 369/112.08, 112.13, 112.2, 112.23, 112.26; 359/717
See application file for complete search history.

(56) References Cited

U.S. PATENT DOCUMENTS

| | | | | |
|---|---|---|---|---|
| 5,936,928 A * | 8/1999 | Jain et al. | ......................... | 369/99 |
| 6,005,834 A | 12/1999 | Maeda et al. | | |
| 6,324,129 B1 * | 11/2001 | Durnin et al. | .............. | 369/13.17 |
| 6,580,675 B1 * | 6/2003 | Burroughs | ..................... | 369/116 |
| 6,633,439 B1 | 10/2003 | Xu et al. | | |
| 2001/0050896 A1 | 12/2001 | Hajjar et al. | | |
| 2003/0048739 A1 * | 3/2003 | Yamada et al. | .......... | 369/112.26 |
| 2005/0152233 A1 * | 7/2005 | Hajjar | ......................... | 369/13.33 |
| 2005/0237914 A1 * | 10/2005 | Oshima et al. | ................ | 369/283 |
| 2007/0091743 A1 * | 4/2007 | Lee et al. | .................... | 369/44.32 |
| 2007/0217300 A1 | 9/2007 | Koyama et al. | | |
| 2008/0117788 A1 * | 5/2008 | Kasazumi et al. | ............ | 369/103 |
| 2009/0003184 A1 * | 1/2009 | Seo et al. | .................. | 369/112.23 |
| 2009/0190461 A1 * | 7/2009 | Van Der Mark et al. | | 369/112.23 |

FOREIGN PATENT DOCUMENTS

| | | |
|---|---|---|
| JP | 08-212579 | 8/1996 |
| JP | 11-259897 | 9/1999 |
| JP | 2006-190400 | 7/2006 |
| KR | 10-2008-0034384 | 4/2008 |

OTHER PUBLICATIONS

European Search Report issued on Jan. 4, 2010, in corresponding European Application No. 09174869.9 (10 pages).

\* cited by examiner

*Primary Examiner* — Joseph Feild
*Assistant Examiner* — Aneeta Yodichkas
(74) *Attorney, Agent, or Firm* — NSIP Law (57) ABSTRACT

A compatible near field optical recording/reproducing apparatus includes a solid immersion lens unit including a first lens, which has an aspherical surface in which light incident from the first light source is condensed, and a second lens, which realizes a high numerical aperture via a near field effect by light condensed by the first lens and has an aspherical surface. An effective beam size-controlling device controls an effective size of a light beam transmitted to the solid immersion lens unit such that either near field light or far field light is transmitted to an information storage medium by the solid immersion lens unit and a focal point adjusting optical system adjusts a focal position of light transmitted to the information storage medium according to the type of the information storage medium.

20 Claims, 10 Drawing Sheets

COMPATIBLE NEAR FIELD OPTICAL RECORDING/REPRODUCING APPARATUS

CROSS-REFERENCE TO RELATED APPLICATIONS

This application claims the benefit of Korean Patent Application No. 10-2008-0109036, filed on Nov. 4, 2008, in the Korean Intellectual Property Office, the disclosure of which is incorporated herein in its entirety by reference.

BACKGROUND

1. Field

The following description relates to an optical recording/reproducing apparatus, and more particularly, to a compatible near field optical recording/reproducing apparatus that is used in both near field and far field recording/reproduction.

2. Description of the Related Art

The size of an optical spot is an important factor affecting the storage capacity of information storage media, such as optical disks. Information corresponding to marks or pits having small sizes may be recorded and/or reproduced with small optical spots. Thus, the storage density may be increased if the size of the optical spots is small. A wavelength of light may be reduced or a numerical aperture (NA) of an objective lens may be increased in order to reduce the size of an optical spot. Compact discs (CDs), digital versatile discs (DVDs), high definition DVDs (HD DVDs), and Blu-ray discs (BDs) have been developed having different wavelengths of light and NAs in order to reduce the size of an optical spot. Recording/reproducing for CDs, DVDs, BDs, HD DVDs is performed using a far field recording/reproducing technique, which is a technique in which the distance between an objective lens and an information storage medium is on the order of millimeters, which corresponds to a far field having a dimension thousands of times greater than a wavelength of light.

In a near field optical recording/reproduction technique that has been recently studied, the distance between a lens and an information storage medium is of the order of tens of nanometers, which is shorter than a wavelength of light. The near field optical recording/reproduction technique is also referred to as a "near field technique." Even if such a near field optical recording/reproduction technique is performed using the same wavelength of light that is used in a far field optical recording/reproduction technique, an NA may be greater than 1. Therefore, the size of an optical spot may further be reduced to further increase data density.

It is desirable for an optical recording/reproducing apparatus to have backward compatibility so that recording/reproduction may be performed using another information storage medium. Thus, it is desirable for the near field recording/reproducing (NFR) technique to have backward compatibility.

Far field recording/reproducing (FFR) techniques and NFR techniques are different from each other in terms of compatibility. For example, the techniques differ in NA, working distance between information storage media, and thickness of a cover layer of the information storage medium. According to the NFR technique, a focal point is formed at a region close to the bottom surface of a ball lens, and according to the FFR technique, a focal point is formed beyond the working distance in order to prevent a collision between an objective lens and an information storage medium and a cover layer of about 100 μm. In order to satisfy geometric optical characteristics of the two optical systems, the incident angle of a beam incident onto a focusing lens may be significantly changed.

SUMMARY

One or more embodiments include compatible near field optical recording/reproducing apparatus that can be used in both near field and far field recording/reproduction.

To achieve the above and/or other aspects, one or more embodiments may include compatible near field optical recording/reproducing apparatus which compatibly uses an information storage medium using near field light and an information storage medium using far field light, the apparatus including: a first light source; a solid immersion lens unit including a first lens which has an aspherical surface in which light incident from the first light source is condensed and a second lens which realizes a high numerical aperture via a near field effect by light condensed by the first lens and has an aspherical surface; an effective beam size-controlling device which controls an effective size of a light beam transmitted to the solid immersion lens unit such either near field light or far field light is transmitted to an information storage medium by the solid immersion lens unit based on whether the information storage medium is an information storage medium using near field light or an information storage medium using far field light; and a focal point adjusting optical system which adjusts a focal position of light transmitted to the information storage medium according to the type of the information storage medium.

According to an aspect of the present invention, the second lens may include a hemispherical or super hemispherical ball lens and an aspherical adjustment surface.

According to an aspect, the ball lens may have a spherical surface, and the second lens may include an addition lens which contacts the spherical surface of the ball lens and includes an aspherical adjustment surface facing the first lens.

According to an aspect, the ball lens and the addition lens may have different refractive indices.

According to an aspect, both surfaces of the first lens may be aspherical.

According to an aspect, the effective beam size-controlling device may include a passive diffractive optical element or an active liquid crystal device.

According to an aspect, the focal point adjusting optical system may include at least two lenses and adjusts a focal position of light by driving at least one of the at least two lenses.

According to an aspect, the compatible near field optical recording/reproducing apparatus may further include: a first photodetector receiving light reflected from the information storage medium to detect an information signal of an error signal; and a second photodetector detecting a gap error signal for controlling a gap servo during the near field optical recording and reproduction.

According to an aspect, light emitted from the first light source may be used to detect a gap error signal.

According to an aspect, the compatible near field optical recording/reproducing apparatus may further include: a second light source emitting light used to detect the gap error signal, wherein the first and second light sources emit light having different wavelengths; and a dichroic optical device that combines optical paths of light emitted from the first and second light sources.

According to an aspect, the first light source may emit light in a blue wavelength range, and the information storage medium using far field light may be a Blu-ray disc.

According to a compatible near field optical recording/reproducing apparatus of the example embodiment, working distance differences between an information storage medium for far field recording/reproduction (FFR), such as a Blu-ray disc (BD), and an information storage medium for near field recording/reproduction (NFR) are adjusted to compatibly use an information storage medium using far field light and an information storage medium using near field light.

Additional aspects and/or features of the invention will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to examples which are illustrated in the accompanying drawings, wherein like reference numerals refer to the like elements throughout. The examples are described below by referring to the figures.

A compatible near field optical recording/reproducing apparatus according to an embodiment includes a solid immersion lens (SIL) unit, which includes first and second lenses, that is, an objective lens and a ball lens, to realize near field optical recording/reproduction (NFR). The compatible near field optical recording/reproducing apparatus further includes an adjustment surface in the ball lens so that the apparatus may be compatibly used with an information storage medium having another format in which information recording/reproduction is performed using far field light (FFR), e.g., a Blu-ray disc (BD). A working distance for an information storage medium for FFR, e.g., a BD, and the working distance for an information storage medium for NFR may be adjusted to be the same.

Figure 1:
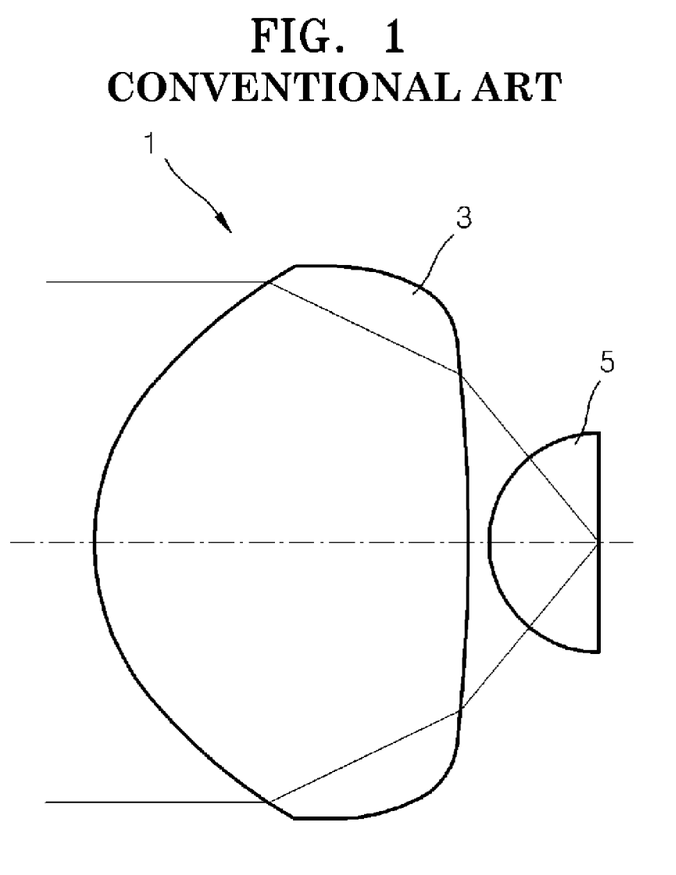
FIG. 1 schematically illustrates a conventional solid immersion lens unit.

FIG. 1 schematically illustrates a sample of a solid immersion lens unit 1. Referring to FIG. 1, the sample lens unit 1 includes an objective lens 3 and a ball lens 5. The objective lens 3 is an aspherical lens, and the ball lens 5 has a spherical surface.

In the sample lens unit 1 illustrated in FIG. 1, which is used exclusively for near field recording/reproduction, a focal point is formed at a region close to the bottom surface of the ball lens 5.

Numerical apertures (NAs), working distances, and thicknesses of the cover layer of an information storage medium for far field recording/reproduction (FFR), such as a Blu-ray disc (BD), and an information storage medium for NFR as compared with each other are shown in Table 1 below.

TABLE 1

|  | NA | Working distance | Thickness of cover layer |
| --- | --- | --- | --- |
| FFR | 0.85 | >100 μm | 100 μm |
| NFR | >1 | <100 nm | <10 μm |

As shown in Table 1, while the information storage medium for FFR has a working distance of greater than 100 μm and the thickness of the cover layer is 100 μm, the information storage medium for NFR has a working distance of less than 100 nm, for example 20 to 30 nm, and the thickness of the cover layer is less than 10 μm, for example, 0.5 to 3 μm even though the format of the NFR information storage medium is not determined.

It is difficult to compatibly apply the sample lens unit 1 as illustrated in FIG. 1 to both FFR and the NFR apparatuses because the difference in working distances with respect to the FFR and the NFR apparatuses respectively is considerable. An incidence angle of a light beam incident onto a focusing lens, i.e., an objective lens, should be considerably changed for the lens to satisfy geometric optical characteristics of both of an optical system for FFR and an optical system for NFR and thus to be compatibly used therefor. Thus, the solid immersion lens unit should be designed to focus both beams having considerably different incidence angles.

Compatibility between a NFR apparatus having a NA of equal to or greater than 1 and a lower ranking format selected from a group consisting of a BD format with a NA of 0.85, a DVD format with a NA of 0.6, and a CD format with a NA of 0.45 varies according to the thickness of the cover layer and the size of the beam spot.

The thickness of the cover layer of CDs is 1.1 mm, the thickness of the cover layer of DVDs is 0.6 mm, the thickness of the cover layer of BDs is 0.1 mm. The thickness of the cover layer of NFR apparatuses may be less than several μm as described above.

The thickness of the cover layer may be varied not only by the basic format difference, but also by the number of layers. In this regard, a recording layer farther from the objective lens has a thicker effective cover layer since space layers are added to the cover layer. In addition, as the number of recording layers increases, the thickness of the effective cover layer increases.

Since spherical aberration is generated by variations in thickness of the cover layer, an optical system may be designed to compensate for wavefront aberration such as spherical aberration generated by the thickness variation of the cover layer. An optical system corresponding to at least two formats or multi-layers should be capable of compensating spherical aberration generated by the differences.

The size of a light concentration spot is influenced by the NA and the wavelength of light. The wavelength of a CD light source may be about 780 nm, the wavelength of a DVD light source may be about 650 nm, and the wavelengths of BD and NFR medium light sources may be about 405 nm. Thus, the defined sizes of light concentration spots of CDs, DVDs, BDs, and NFR media may respectively be about 1.7 μm, about 1.08 μm, about 0.48 μm, and about 0.22 μm (NA 1.8) (beam spot size=wavelength/NA).

The spot sizes of each of the formats should be within the range described above in order to effectively perform recording/reproduction in the information storage medium.

In order to change the spot size, the NA or the wavelength may be modified. However, since it is difficult to modify the wavelength of a laser diode, which typically constitutes the light source, the NA of the objective lens is modified. In general, the NA may be obtained using the equation "NA=effective beam diameter/focal distance", and thus the effective beam diameter may be changed in order to change the NA.

Accordingly, for the compatible use of the near field optical recording/reproducing apparatus, techniques for compensating wavefront aberration such as spherical aberration due to variation in the thickness of the cover layer and for changing the size of optical spots are desired.

The compatible near field optical recording/reproducing apparatus according to an example embodiment may provide such techniques.

Figure 2:
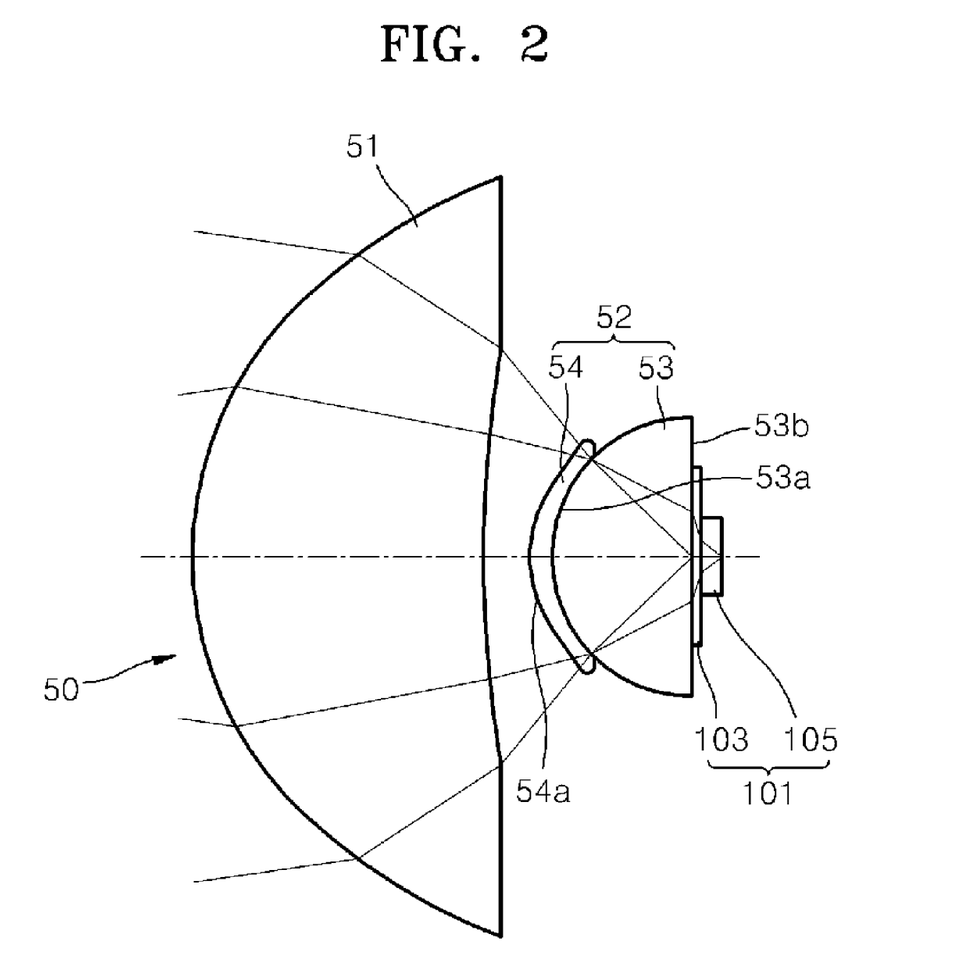
FIG. 2 schematically illustrates a solid immersion lens unit according to an example embodiment.

FIG. 2 schematically illustrates a solid immersion lens unit 50 according to an example embodiment.

Referring to FIG. 2, the solid immersion lens unit 50 according to the present embodiment includes a first lens 51 and a second lens 52 to record information on an information storage layer of an information storage medium or reproduce information from the information storage layer using near field coupling, and also to perform far field optical recording and reproduction.

The first lens 51 may include a condensing lens that corresponds to a conventional objective lens. The first lens 51 may have at least one aspherical surface. For example, both surfaces of the first lens 51 may be aspherical.

The second lens 52 is a lens that provides a high NA of equal to or greater than 1.0 using a near field effect. The second lens 52 may include a ball lens 53, i.e., a hemispherical or a super hemispherical ball lens and an addition lens 54 having an aspherical adjustment surface 54a to provide far field optical recording/reproduction by compatibly using the near field optical recording/reproducing apparatus. In particular, the ball lens 53 has a spherical surface 53a and a bottom surface 53b. The addition lens 54 is formed on the spherical surface 53a of the ball lens 53 and includes an aspherical adjustment surface 54a facing the first lens 51.

The ball lens 53 and the addition lens 54 may have different refractive indices. For example, the ball lens 53 may have a refractive index that is equal to or greater than 1.8 or equal to or greater than 2.0 in order to realize a high NA of equal to of greater than 1.0 using the near field effect. The addition lens 54 may have a refractive index less than that of the ball lens 53. For example, the refractive index of the addition lens 54 may be in a range of about 1.5 to about 1.6. The addition lens 54 may be formed of a material that may form an aspherical surface by molding. Referring to FIG. 2, the second lens 52 includes the ball lens 53 and the addition lens 54 with an aspherical adjustment surface 54a. However, the solid immersion lens unit 50 according to the present embodiment and which is used in a compatible near field optical recording/reproducing apparatus is not limited thereto. For example, the second lens 52 may only include the ball lens 53 having an aspherical surface.

FIG. 2 also schematically illustrates an information storage medium 101 exemplified by an information storage medium 103 for near field recording/reproduction and an information storage medium 105 for far field recording/reproduction. Both types of information storage media are shown in the same drawing to illustrate the difference in location of the information storage medium 103 for near field recording/reproduction and the information storage medium 105 for far field recording/reproduction with respect to the solid immersion lens unit 50 and the differences in beam size and focal point with respect to each type of medium. It is to be understood that typically, both the information storage medium 103 for near field recording/reproduction and the information storage medium 105 for far field recording/reproduction will not be present at the same time.

Figure 3:
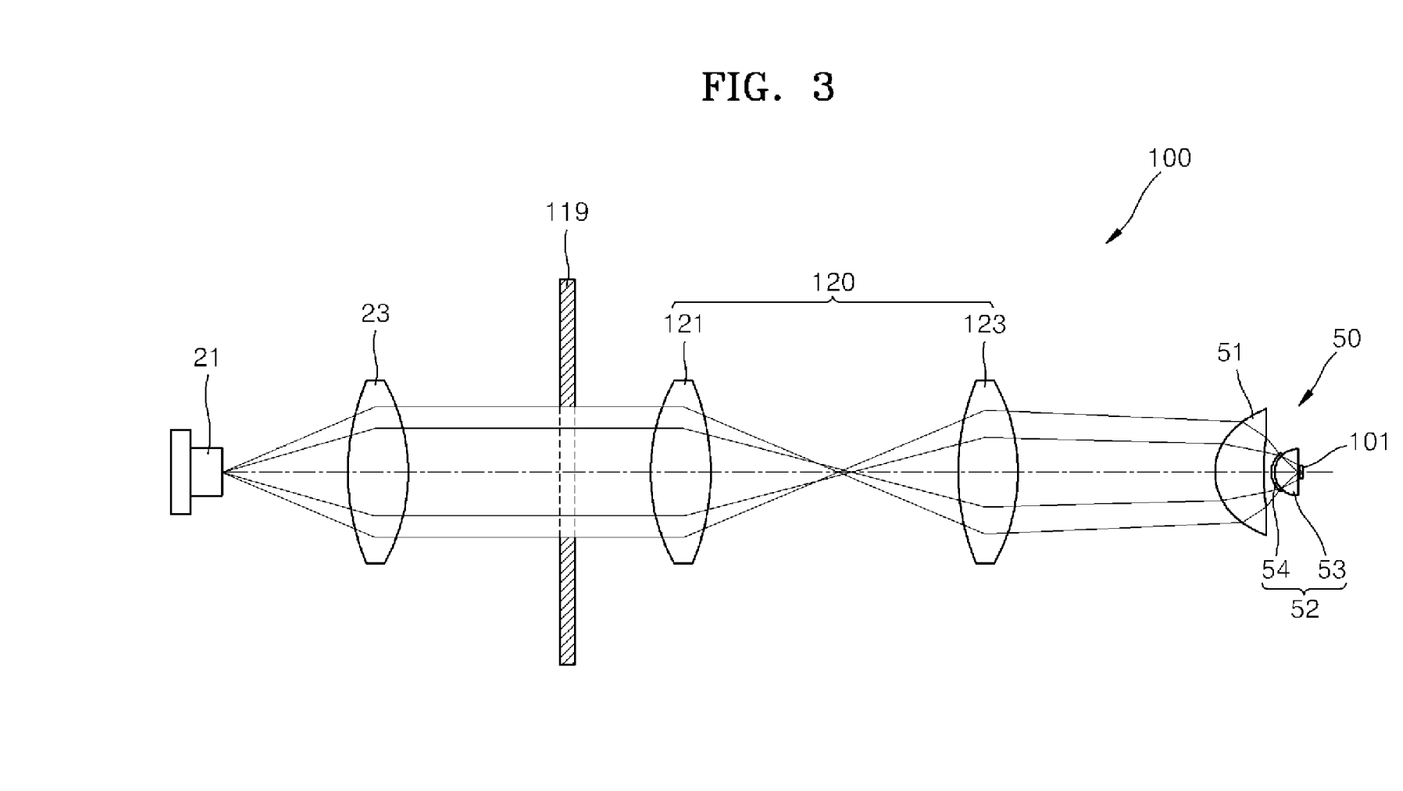
FIG. 3 schematically illustrates a compatible near field optical recording/reproducing apparatus including the solid immersion lens unit of FIG. 2, according to an example embodiment.
Figure 4:
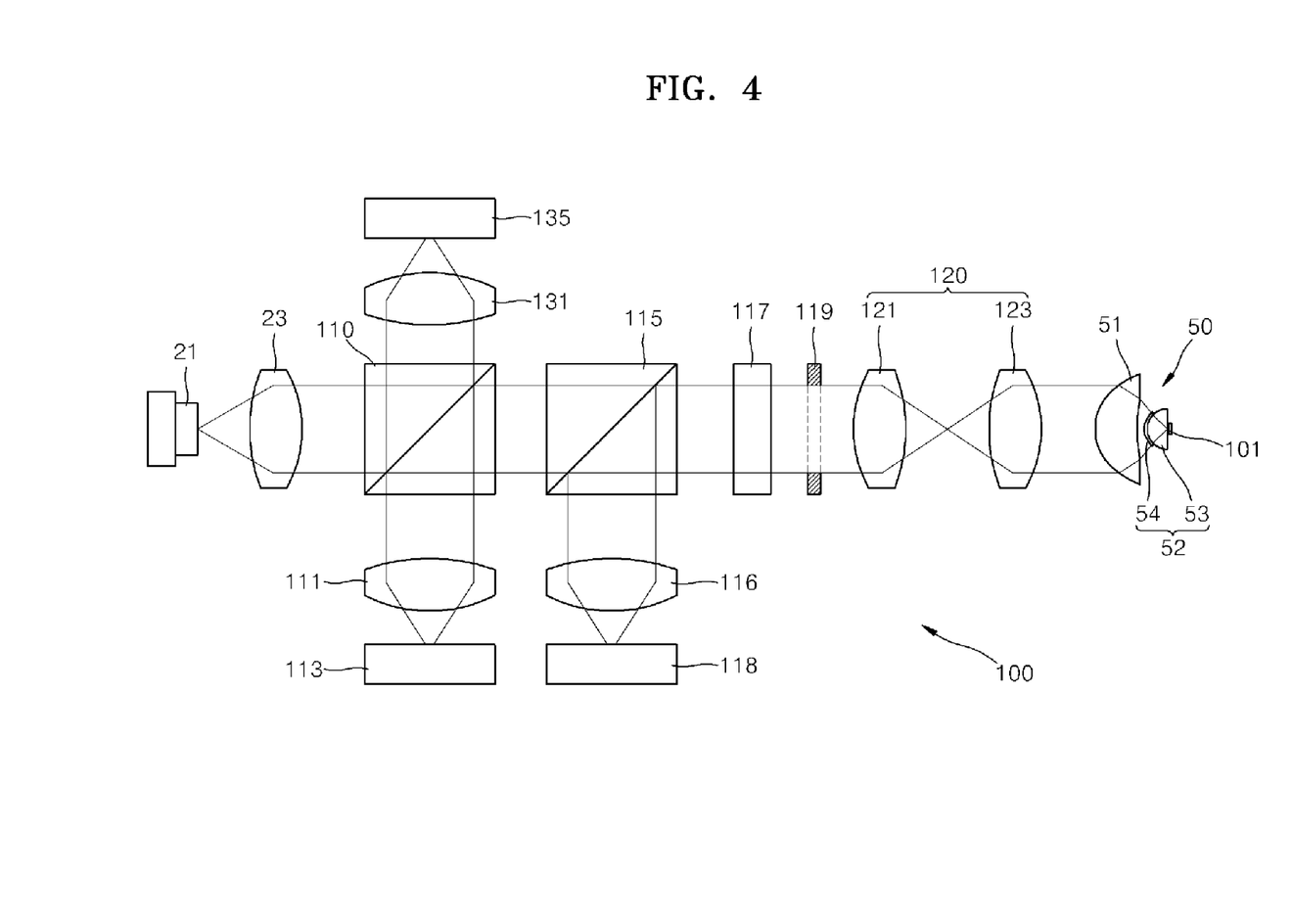
FIG. 4 schematically illustrates in detail the optical structure of the compatible near field optical recording/reproducing apparatus of FIG. 3 according to an example embodiment.

FIG. 3 schematically illustrates a principal part of a compatible near field optical recording/reproducing apparatus 100 including the solid immersion lens unit 50 of FIG. 2, according to an example embodiment. FIG. 4 schematically illustrates a more complete structure of the compatible near field optical recording/reproducing apparatus 100 according to an example embodiment.

Referring to FIGS. 3 and 4, the compatible near field optical recording/reproducing apparatus 100 according to the present embodiment includes a light source 21, a solid immersion lens unit 50, a focal point adjusting optical system 120, and an effective beam size-controlling device 119 that controls the size of a light beam incident onto the solid immersion lens unit 50. The compatible near field optical recording/reproducing apparatus 100 may further include a first photodetector 118, which receives light reflected from an information storage medium 101 and detects an information signal or an error signal, and a second photodetector 113, which detects a gap error signal (GES) to control a gap servo. Furthermore, the compatible near field optical recording/reproducing apparatus 100 may further include a collimating lens 23, which collimates light emitted from the light source 21 to form parallel light beams.

The light source 21 may include a laser diode that emits linearly polarized light in a particular wavelength range. For example, the light source 21 may include a laser diode that emits light in a blue wavelength range, such as, for example, light with a wavelength of 405 nm satisfying standard requirements for HD DVDs and BDs. The light source 21 may also emit light in other wavelength bands. The power of the light source 21 may be monitored by a monitor photodetector 135.

The linearly polarized light emitted from the light source 21 passes through the collimating lens 23. The collimating lens 23 collimates divergent light to form parallel light beams. The collimated light passes through second and first optical path changers 110 and 115 and the focal point adjusting optical system 120, and then is incident onto the solid immersion lens unit 50.

The first optical path changer 115 changes an advancing path of incident light such that light incident from the light source 21 advances toward the solid immersion lens unit 50 and light reflected from the information storage medium 101 and having passed through the solid immersion lens unit 50 is reflected toward the first photodetector 118.

The first optical path changer 115 may be a polarization beam splitter. If the first optical path changer 115 is a polarization beam splitter, a wave plate, e.g., a quarter wave plate 117, may further be installed in an optical path formed between the first optical path changer 115 and the solid immersion lens unit 50. The quarter wave plate 117 changes the polarization of incident light.

If the first optical path changer 115 is a polarization beam splitter, and the quarter wave plate 117 is installed as described above, first linearly polarized light, which is emitted from the light source 21 and is transmitted through the first optical path changer 115, is changed into circularly polarized light while passing through the quarter wave plate 117 and focused by the solid immersion lens unit 50. The circularly polarized light is reflected from the information storage medium 101 to be transformed into other orthogonal circularly polarized light, is changed into orthogonal second linearly polarized light while being transmitted through the quarter wave plate 117, and is reflected from the first optical path changer 115 toward the first photodetector 118.

A portion of the light reflected from the information storage medium 101 may be reflected from the second optical path changer 110 positioned between the light source 21 and the first optical path changer 115 and then detected by the second photodetector 113, because when an NA is greater than 1, a phase change of P-polarized light is different from a phase change of S-polarized light during total reflection. For example, when right circularly polarized light is incident onto the information storage medium 101, the light reflected from the information storage medium 101 is changed into left circularly polarized light. Thus, the reflected light may include a portion of the right polarized light in addition to the left circularly polarized light due to a phase change difference. Therefore, a portion of light reflected from the information storage medium 101 is transmitted through the first optical path changer 115, and thus a portion of the light reflected from the information storage medium 101 is reflected from the second optical path changer 110 and then detected by the second photodetector 113.

The second optical path changer 110 changes an advancing path of incident light such that light incident from the light source 21 advances toward the solid immersion lens unit 50, and a portion of light reflected from the information storage medium 101 is transmitted through the solid immersion lens unit 50, is transmitted through the first optical path changer 115, and is reflected toward the second photodetector 113 used for a gap servo function. The second optical path changer 110 may be a beam splitter that transmits and reflects incident light at a particular ratio.

Sensor lenses 116 and 111 may be installed in optical paths formed between the first optical path changer 115 and the first photodetector 118 and between the second optical path changer 110 and the second photodetector 113, respectively. The monitoring photodetector 135 may further be installed to detect a portion of light that is incident from the light source 21 and reflected from the second optical path changer 110. The monitoring photodetector 135 outputs a monitoring signal that is to be used to control an amount of light output from the light source 21. A sensor lens 131 may further be installed in an optical path formed between the monitoring photodetector 135 and the second optical path changer 110. Light emitted from the light source 21 is mainly linearly polarized light but may include other linearly polarized components. In this case, a portion of light emitted from the light source 21 may be reflected from the first optical path changer 115. Thus, the monitoring photodetector 135 and the sensor lens 131 may be disposed to detect light that is incident from the light source 21 and partially reflected from the first optical path changer 115.

The focal point adjusting optical system 120 is used to adjust a focal point of the compatible near field optical recording/reproducing apparatus 100. The focal point adjusting optical system 120 adjusts the position of the focal point based on whether the information storage medium 101 is an information storage medium using near field light (information storage medium 103 of FIG. 5) or an information storage medium using far field light (information storage medium 105 of FIG. 6).

Figure 5:
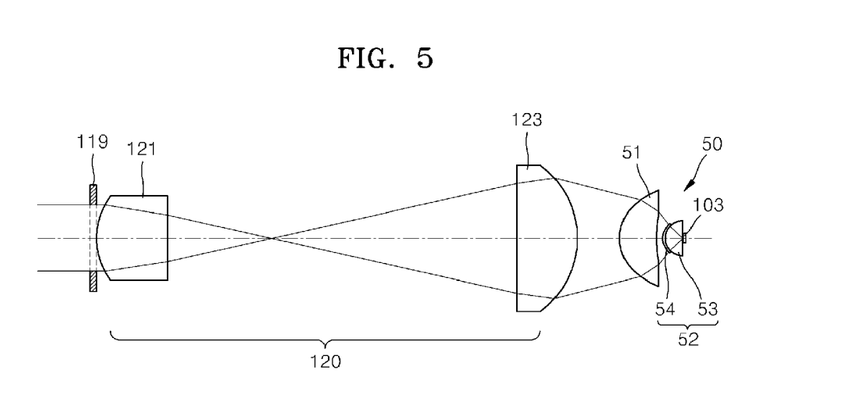
FIG. 5 schematically illustrates layouts of a focal point adjusting optical system and a solid immersion lens unit and optical paths according to a near field recording/reproduction (NFR) technique.

For example, if the information storage medium 101 is the information storage medium 103 for near field recording/reproduction as illustrated in FIG. 5, light is focused on the bottom surface of the second lens 52 facing the information storage medium 101 of the solid immersion lens unit 50, that is, the bottom surface of the ball lens 53, or the inside of the cover layer of the information storage medium 103 for near field recording/reproduction. If the information storage medium 101 is the information storage medium 105 for far field recording/reproduction, such as a BD, which has a thicker the cover layer and a longer desired working distance compared to an information storage medium for near field recording/reproduction, as illustrated in FIG. 6, the focal position of light is adjusted such that the light is focused on the inside surface, i.e., the information recording surface of the cover layer of the BD.

The focal point adjusting optical system 120 includes at least two lenses, and the focal position of light is adjusted by driving at least one of the at least two lenses. For example, the focal point adjusting optical system 120 may include a first relay lens 121 and a second relay lens 123. The first and second relay lenses 121 and 123 may be constituted such that light incident from the light source 21 is focused by the first relay lens 121, is divergently emitted from the focal position, is incident onto the second relay lens 123, and is condensed by the second relay lens 123. The focal position of light focused on the information storage medium 101 may be altered by adjusting the position of at least one of the first and second relay lenses 121 and 123 along an optical axis. According to FIGS. 5 and 6, the focal position of light may be changed by adjusting the position of the second relay lens 123, which is disposed closer to the solid immersion lens unit 50.

Near field recording/reproduction may be performed using a surface recording method or a cover inside recording method. According to the surface recording method, light is focused on the bottom surface 53b of the second lens 52 of the solid immersion lens unit 50. On the other hand, according to the cover inside recording method, light passes through air gap between the bottom surface 53b of the second lens 52 of the solid immersion lens unit 50 and the information storage medium 101 to be focused on the inside of the cover layer of the information storage medium 103.

Figure 6:
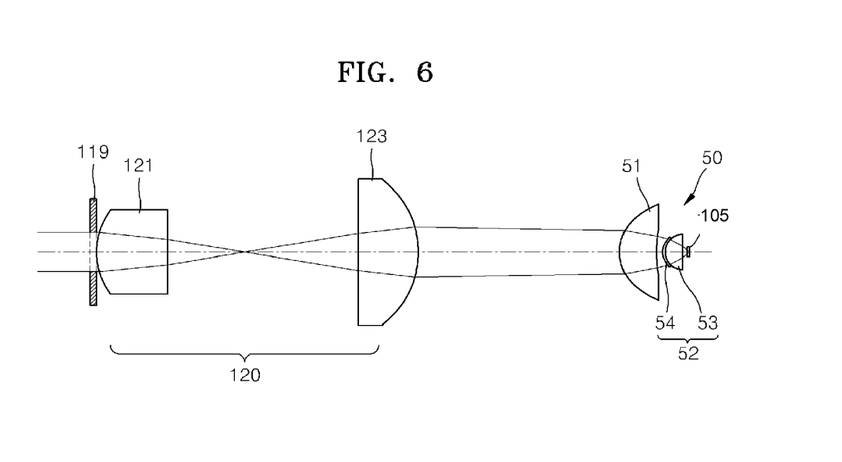
FIG. 6 schematically illustrates layouts of a focal point adjusting optical system and a solid immersion lens unit and optical paths according to a Blu-ray disc (BD) technique.

FIGS. 5 and 6 show light focus states suitable for the cover inside recording method.

The effective beam size-controlling device 119 adjusts an effective size of the light beam transmitted to the solid immersion lens unit 50 such that either near field light or far field light is transmitted to the information storage medium 101 by the solid immersion lens unit 50 based on whether the information storage medium 101 is an information storage medium using near field light (information storage medium 103 of FIG. 5) or an information storage medium using far field light (information storage medium 105 of FIG. 6).

The effective beam size-controlling device 119 may be a passive device or an active device to effectively change the effective size of an incident beam for compatible use of NFR and FFR apparatuses.

The active device may be an electro-mechanical device in which the size of an aperture is changed by voltage or current, or an electro-mechanical or optical device in which the position of the aperture is varied in the optical path due to a positional change of the aperture or of the optical device.

The passive device may be a passive diffractive optical device using diffraction of light, for example, a diffractive optical element (DOE), a holography optical element (HOE), or a liquid crystal (LC).

Figure 7:
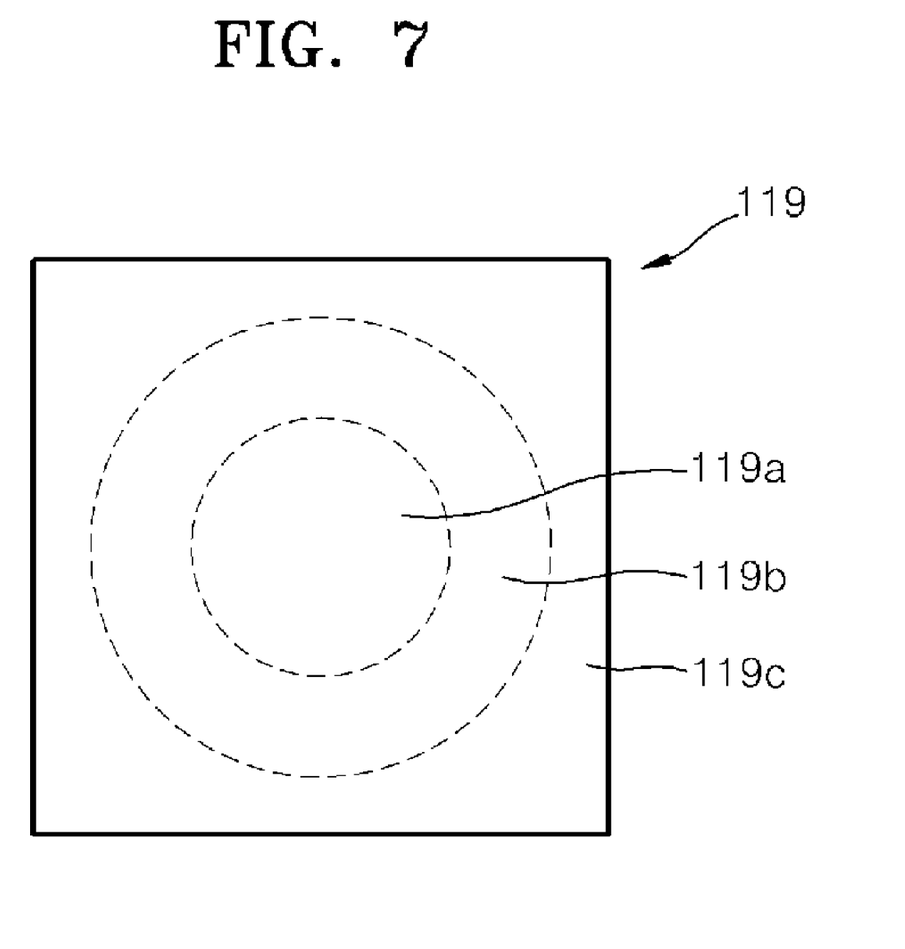
FIG. 7 schematically illustrates an effective beam size-controlling device of the compatible near field optical recording/reproducing apparatus of FIG. 2, according to an example embodiment.

FIG. 7 schematically illustrates the effective beam size-controlling device 119 according to an example embodiment.

Referring to FIG. 7, the effective beam size-controlling device 119 according to the present embodiment may include a first region 119a that always allows incident light to be transmitted therethrough and that corresponds to the effective size for a far field recording/reproducing apparatus, a second region 119b that blocks light when near field recording/reproduction is applied and allows light to be transmitted therethough when an information storage medium using far field recording/reproduction, e.g., a BD, is applied, and a third region 119c that always blocks light.

If the entire optical system of the compatible near field optical recording/reproducing apparatus is constituted such that the maximum effective size of light beam is suitable for near field recording/reproduction, the effective beam size-controlling device 119 may only include the first and second regions 119a and 119b without the third region 119c of FIG. 7.

The solid immersion lens unit 50 may include the first and second lenses 51 and 52 as described with reference to FIG. 2. A high effective numerical aperture of equal to or greater than 1 may be obtained by the second lens 52 to perform near field recording/reproduction with high recording density. In addition, not only near field recording/reproduction but also far field recording/reproduction may be performed by the aspherical adjustment surface 54a of the second lens 52, the effective beam size-controlling device 119, and the focal point adjusting optical system 120. In this regard, near field recording/reproduction and far field recording/reproduction may be compatibly performed.

For example, the compatible near field optical recording/reproducing apparatus according to the present embodiment, particularly the focal point adjusting optical system 120, the solid immersion lens unit 50, and the effective beam size-controlling device 119, may be constituted such that the near field recording/reproducing apparatus using the focal point adjusting optical system 120 of FIG. 5 has an NA of about 1.45, a thickness of a cover layer of about 5 µm, an entrance pupil diameter of about 2.4 mm, and the near field recording/reproducing apparatus using the focal point adjusting optical system 120 of FIG. 6 has an NA of about 0.85, a thickness of a cover layer of about 100 µm, and an entrance pupil diameter of about 1.2 mm. While the interval between the solid immersion lens unit 50 and the information storage medium 101 should be maintained to be equal to or less than about $\lambda/4$ in the NFR apparatus, the working distance should be maintained to be equal to or greater than 40 µm in the BD since the BD may be more efficiently operated as the interval between the solid immersion lens unit 50 and the information storage medium 101 increases.

Meanwhile, the air gap between the second lens 52 of the solid immersion lens unit 50 and the information storage medium 101 should be maintained to be equal to or less than 100 nm, for example within the range of about 20 to about 30 nm, during the near field recording/reproduction since the spot size is rapidly increased and an evanescent wave is decayed. In this case, a tight gap servo and tilt margin control is desirable. That is, a stable gap servo control is desirable in consideration of a small air gap in order to inhibit collision between the information storage medium 101 and the second lens 52 of the solid immersion lens unit 50 during the near field recording/reproduction.

Light incident onto the information storage medium 101 is reflected from the information storage medium 101, is collected by the solid immersion lens unit 50, passes through the focal point adjusting optical system 120, and is partially reflected by the first and second optical path changers 115 and 110. The first photodetector 118 detects an information signal, i.e., a radio frequency (RF) signal, or the like, and the second photodetector 113 detects a gap error signal (GES) that is used as a servo signal for uniformly maintaining the air gap formed between the tip of the second lens 52 of the solid immersion lens unit 50 and the information storage medium 101.

A near-field optical recording technique is different from a far-field optical recording technique in that the far-field optical recording technique uses an astigmatic method, spot size detection (SSD) for a focus servo, while the near-field optical recording technique additionally uses the second photodetector 113 to detect an additional GES for controlling an air gap.

As shown in FIG. 4, the compatible near-field optical recording/reproducing system 100 uses a tracking method using a single light beam to control a tracking servo. Instead of this method, the compatible near-field optical recording/reproducing system 100 may further include a grating (not shown) that diffracts a light beam emitted from the light source 21 into $0^{th}$-order and $1^{st}$-order beams, in order to use a tracking method using three beams. A tracking signal may be obtained from a signal detected by the first photodetector 118.

The compatible near-field optical recording/reproducing system 100 according to the current embodiment may adjust the relative tilt between the solid immersion lens unit 50 and the information storage medium 101 using an actuator (not shown) that actuates the solid immersion lens unit 50. The solid immersion lens unit 50 may adjust a tilt to prevent collision of the actuator with the information storage medium 101.

The actuator (not shown) may have a structure identical or similar to a 3-axis or 4-axis driving actuator used in a far-field optical recording/reproduction technique. The term "3-axis driving" refers to driving in focus, tracking, and radial tilt directions, and the term "4-axis driving" refers to driving in focus, tracking, radial tilt, and tangential tilt directions. The detailed structure of the actuator is well known in the optical recording field, and thus an explanation thereof will not be provided here.

As described above, light emitted from the light source 21 may be used to detect the gap error signal. However, an additional light source may further be used to detect the gap error signals.

Figure 8:
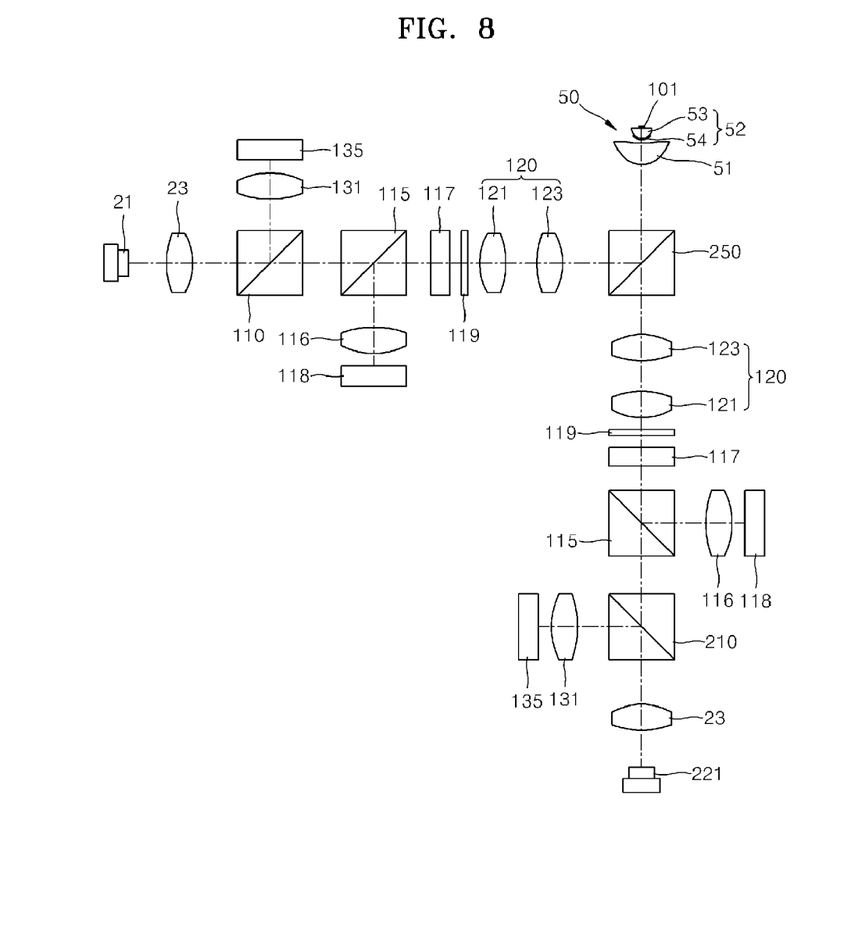
FIG. 8 schematically illustrates the optical structure of a compatible near field optical recording/reproducing apparatus according to another example embodiment.

FIG. 8 schematically illustrates the optical structure of a compatible near field optical recording/reproducing apparatus according to another example embodiment. Referring to FIG. 8, the compatible near field optical recording/reproducing apparatus according to the present embodiment further includes another light source 221 emitting light used to detect a gap error signal.

In this regard, the light source 221 emits light having a wavelength different from that of light emitted from the light source 21. A dichroic optical device 250, which combines optical paths of light emitted from the light source 21 and the light source 221, may be disposed between optical paths between the light sources 21 and 221 and the solid immersion lens unit 50. The dichroic optical device 250 may be disposed in the optical path between the focal point adjusting optical system 120 and the solid immersion lens unit 50 as illustrated in FIG. 8. In FIG. 8, the optical system for recording/reproduction disposed in the optical path between the light source 21 and the dichroic optical device 250 has the same structure as that of the optical system for detecting a gap error signal disposed in the optical path between the light source 221 and the dichroic optical device 250, except that both optical systems use light sources emitting lights having different wavelengths. However, examples are not limited thereto, and the optical system for detecting the gap error signal may have a different structure from that of the optical system for recording/reproduction.

Figure 9:
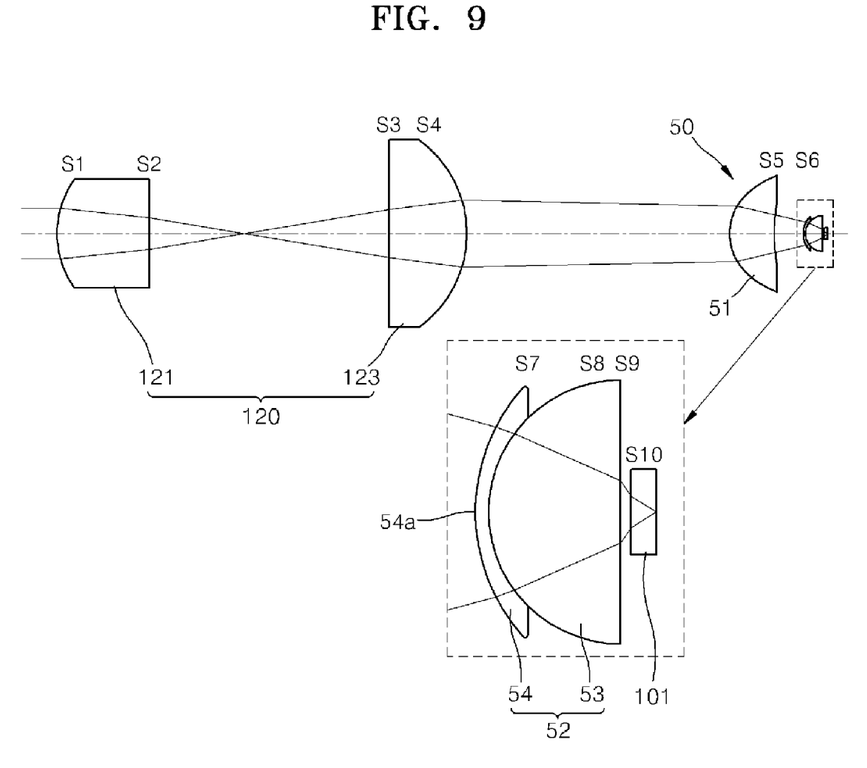
FIG. 9 schematically illustrates the structure of a focal point adjusting optical system and a solid immersion lens unit of the compatible near field optical recording/reproducing apparatus of FIG. 8, according to an example embodiment.

Hereinafter, the focal point adjusting optical system 120 and the solid immersion lens unit 50 will be described with reference to FIG. 9. Referring to FIG. 9, the first lens 51, i.e., an objective lens, is a both-plane aspherical plastic lens. In the second lens 52, an addition lens 54 having an adjustment compensation surface 54a may be formed of a medium having a refractive index in the range of about 1.5 to about 1.6 and capable of being molded such that the thickness of the center is equal to or less than 200 μm. A ball lens 53 having a spherical surface may be formed of a highly refractive glass that has a radius of about 500 μm and a refractive index of equal to or greater than 2.

The focal point adjusting optical system 120 may include two plano-aspherical type plastic lenses, that is, the first and second relay lenses 121 and 123. The lens moving distance for compatible use between the far field recording/reproduction and the near field recording/reproduction may be about 5.8 mm.

Data for designing each of the lenses in the focal point adjusting optical system 120 and the solid immersion lens unit 50 is listed in Table 2 below.

TABLE 2

| Surface | Radius of curvature | Thickness (NFR) | Thickness (BD) | Material |
|---|---|---|---|---|
| S1 | aspherical 2.0657 | 2.6016 | | Z-E48R |
| S2 | — Infinity | 12.6402 | 6.7428 | |
| S3 | — Infinity | 2.2000 | | Z-E48R |
| S4 | aspherical −2.7291 | 1.5235 | 7.4209 | |
| S5 | aspherical 1.6719 | 1.8926 | | 801658.44 |
| S6 | aspherical 1.8372 | 0.1649 | | |
| S7 | aspherical 0.6375 | 0.050 | | 520010.47 |
| S8 | spherical 0.5000 | 0.5000 | | LASF35 |
| S9 | — Infinity | 0.0000 | 0.0350 | |
| S10 | — Infinity | 0.0050 | 0.1000 | Polycarbonate |

Referring to Table 2, the first and second relay lenses 121 and 123 of the focal point adjusting optical system 120 are plano-convex aspherical lenses, the first lens 51, i.e., an objective lens, of the solid immersion lens unit 50 is a double-aspherical lens, and the second lens 52 includes the addition lens 54 having an aspherical adjustment surface 54a and the ball lens 53 having a spherical surface which is in contact with the addition lens 54. A depth of an aspherical lens (z) is calculated using Equation 1 below.

$$z = \frac{ch^2}{1 + \sqrt{1 - (1 + K')c^2h^2}} + Ah^4 + Bh^6 + Ch^8 + Dh^{10} + Eh^{12} + Fh^{14} + Gh^{16} + Hh^{18} + Jh^{20} \quad \text{Equation 1}$$

In Equation 1, h is a height from the optical axis, c is a radius of curvature, K is a conic constant, and A to J are aspherical coefficients.

In this regard, aspherical lens constants to obtain the data of Table 2 are listed in Table 3 below.

TABLE 3

| | Aspherical coefficient | | | | |
|---|---|---|---|---|---|
| | S1 | S4 | S5 | S6 | S7 |
| Radius of curvature | 2.0657 | −2.7291 | 1.6719 | 1.8372 | 0.6375 |
| Conic | 0.3799 | −0.5769 | — | — | −3.2565 |
| 4 | −0.0385 | −0.0016 | −0.0079 | −0.1443 | 0.8441 |
| 6 | −0.0099 | 0.0008 | −0.0136 | −0.2417 | 15.3760 |
| 8 | 0.0008 | −0.0001 | 0.0047 | −0.3633 | −174.0767 |
| 10 | 0.0006 | — | −0.0024 | 0.8180 | 460.3692 |
| 12 | — | — | — | 0.0246 | — |

A thickness common difference of the solid immersion lens unit 50 for common near field recording/reproduction is equal to or less than about 1 μm.

Figure 10:
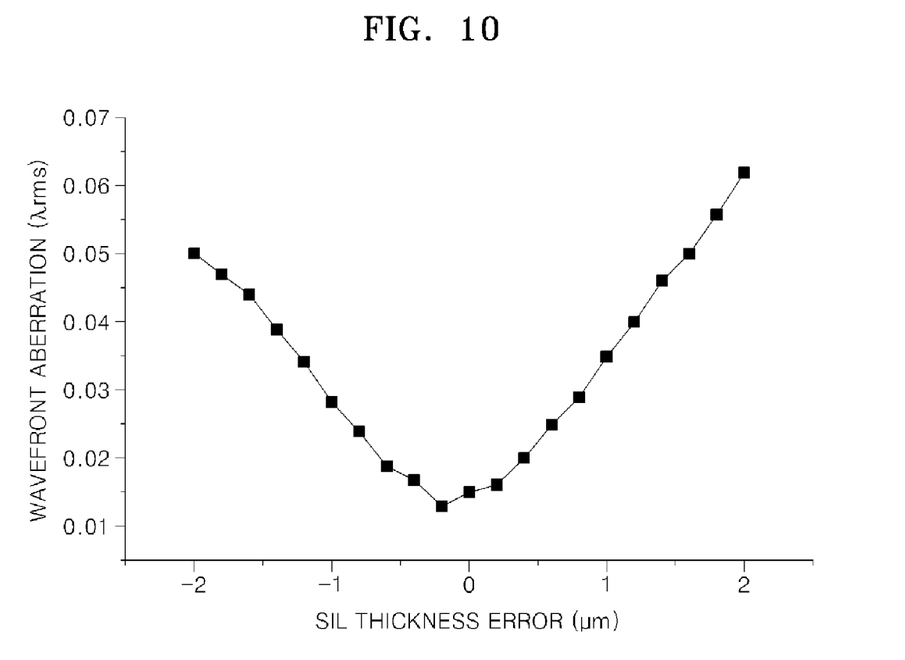
FIG. 10 is a graph illustrating wavefront aberration according to the thickness of the solid immersion lens unit when a focal point adjusting optical system and a solid immersion lens unit are constituted using data shown in Tables 2 and 3.

FIG. 10 is a graph illustrating wavefront aberration according to the thickness of the solid immersion lens unit 50 when the focal point adjusting optical system 120 and the solid immersion lens unit 50 are designed using the data shown in Tables 2 and 3.

Since performance of optical components is generally checked at a wavefront aberration of about 0.035 λrms, the thickness common difference of the solid immersion lens unit 50 of the compatible near field optical recording/reproducing apparatus according to the present embodiment measured at a wavefront aberration of about 0.035 λrms in FIG. 9 is equal to or greater than about 2 μm.

According to an example embodiment, the apparatus may be compatibly used for near field and far field recording/reproduction, and the solid immersion lens unit 50 may be more efficiently manufactured since the thickness common difference of the compatible NFT apparatus according to an example embodiment is greater than that of conventional NFR apparatuses.

Figure 11:
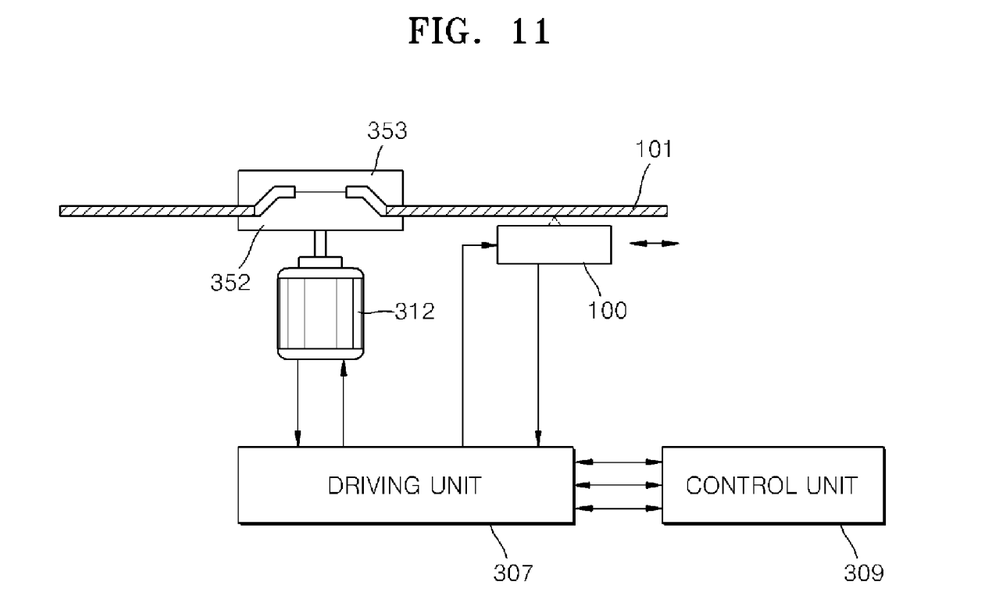
FIG. 11 schematically illustrates the overall structure of a compatible near field optical recording/reproducing apparatus according to an example embodiment.

FIG. 11 schematically illustrates the overall structure of a compatible near field optical recording/reproducing apparatus according to an example embodiment.

Referring to FIG. 11, the compatible near field optical recording/reproducing apparatus according to the present embodiment includes: a spindle motor 312 rotating an information storage medium 101; the optical system 100 for compatible near field optical recording/reproduction aforementioned with reference to several figures, which is installed so as to move in a radial direction of the information storage medium 101 to record information on the information storage medium 101 or reproduce the recorded information; a driving unit 307 driving the spindle motor 312 and the optical system 100; and a control unit 309 which controls a focus, a track servo, a gap servo, etc. of the optical system 100 for compatible near field optical recording/reproduction. The compatible near field optical recording/reproducing apparatus further includes a turntable 352 and a clamp 353 to secure the information storage medium 101.

Light reflected from the information storage medium 101 is detected by the photodetector installed in the optical system 100 for compatible near field optical recording/reproduction, is photoelectrically converted into an electrical signal, and operated in a signal detecting circuit. A signal detected in the signal detection circuit is input to the control unit 309 via the driving unit 307. The driving unit 307 controls the rotation speed of the spindle motor 312, amplifies the input signal, and operates the optical system 100 for compatible near field optical recording/reproduction. The control unit 309 transmits a focus servo order, a tracking servo order, etc. controlled based on the signal input from the driving unit 307 to the control unit 309 to operate focusing, tracking, and gap servo of the optical system 100 for compatible near field optical recording/reproduction.

A compatible near field optical recording/reproducing apparatus having entrance pupil diameters, i.e., sizes of effective diameters of incident light beams, for NFR and BD respectively of 2.4 mm and 1.2 mm has been described. However, the entrance pupil diameters may vary as long as the entrance pupil diameters for the NFR and BD are different from each other.

Also, even though a compatible near field optical recording/reproducing apparatus having a NA for NFR of 1.45 has been described, the NA may vary.

Further, even though a compatible near field optical recording/reproducing apparatus having a thickness of the cover layer for the NFR of 5 µm has been described, the thickness of the cover layer may vary.

Although a few examples have been shown and described, it would be appreciated by those skilled in the art that changes may be made in this embodiment without departing from the principles and spirit of the invention, the scope of which is defined in the claims and their equivalents.

What is claimed is:

1. A compatible near field optical recording/reproducing apparatus that compatibly uses an information storage medium using near field light and an information storage medium using far field light, the apparatus comprising:
   a first light source;
   a solid immersion lens unit, comprising:
      a first lens that has an aspherical surface in which light incident from the first light source is condensed; and
      a second lens that realizes a high numerical aperture via a near field effect by light condensed by the first lens and has an aspherical surface, the second lens comprising an addition lens that contacts a spherical surface, the addition lens comprising an aspherical adjustment surface that faces the first lens;
   an effective beam size-controlling device that controls an effective size of a light beam transmitted to the solid immersion lens unit such that either near field light or far field light is transmitted to an information storage medium by the solid immersion lens unit based on whether the information storage medium is the information storage medium using near field light or the information storage medium using far field light; and
   a focal point adjusting optical system that adjusts a focal position of light transmitted to the information storage medium according to a type of the information storage medium.

2. The compatible near field optical recording/reproducing apparatus of claim 1, wherein the second lens further comprises a hemispherical or super hemispherical ball lens.

3. The compatible near field optical recording/reproducing apparatus of claim 2, wherein the ball lens has the spherical surface.

4. The compatible near field optical recording/reproducing apparatus of claim 2, wherein the ball lens and the addition lens have different refractive indices.

5. The compatible near field optical recording/reproducing apparatus of claim 1, wherein the first lens has an other aspherical surface.

6. The compatible near field optical recording/reproducing apparatus of claim 1, wherein the effective beam size-controlling device comprises a passive diffractive optical element or an active liquid crystal device.

7. The compatible near field optical recording/reproducing apparatus of claim 1, wherein the focal point adjusting optical system comprises at least two relay lenses and adjusts a focal position of light by driving at least one of the at least two relay lenses.

8. The compatible near field optical recording/reproducing apparatus of claim 1, further comprising:
   a first photodetector that receives light reflected from the information storage medium to detect an information signal or an error signal; and
   a second photodetector that detects a gap error signal and controls a gap servo during the near field optical recording and reproduction.

9. The compatible near field optical recording/reproducing apparatus of claim 8, further comprising:
   a first optical path changer that directs light reflected from the information storage medium to the first photodetector; and
   a second optical path changer that directs the gap error signal to the second photodetector.

10. The compatible near field optical recording/reproducing apparatus of claim 8, wherein light emitted from the first light source is used to detect the gap error signal.

11. The compatible near field optical recording/reproducing apparatus of claim 8, further comprising:
    a second light source that emits light used to detect the gap error signal, the first and second light sources emitting light having different wavelengths from one another; and
    a dichroic optical device that combines optical paths of light emitted from the first and second light sources.

12. The compatible near field optical recording/reproducing apparatus of claim 8, wherein the first light source emits light in a blue wavelength range, and the information storage medium using far field light is a Blu-ray disc.

13. The compatible near field optical recording/reproducing apparatus of claim 1, wherein the first light source emits light in a blue wavelength range, and the information storage medium using far field light is a Blu-ray disc.

14. A solid immersion lens unit, comprising:
    a first lens, that has an aspherical surface in which incident light is condensed; and
    a second lens that realizes a high numerical aperture via a near field effect by light condensed by the first lens and has an aspherical surface,
    the second lens comprising an addition lens that contacts a spherical surface, the addition lens comprising an aspherical adjustment surface facing the first lens.

15. The solid immersion lens unit of claim 14, wherein:
    the second lens further comprises a hemispherical or super hemispherical ball lens, the ball lens having the spherical surface, the ball lens and the addition lens having different refractive indices.

16. The solid immersion lens unit of claim 14, wherein the first lens has an other aspherical surface.

17. A compatible near field optical recording/reproducing apparatus configured to compatibly use an information storage medium using near field light and an information storage medium using far field light, the apparatus comprising:
- a first light source;
- a solid immersion lens unit, comprising:
  - a first lens having an aspherical surface in which light incident from the first light source is condensed; and
  - a second lens configured to realize a high numerical aperture via a near field effect by light condensed by the first lens, the second lens having an aspherical surface and comprising:
    - a hemispherical or super hemispherical ball lens; and
    - an addition lens that contacts a spherical surface of the ball lens, the addition lens comprising an aspherical adjustment surface that faces the first lens;
- an effective beam size-controlling device configured to control an effective size of a light beam transmitted to the solid immersion lens unit such that either near field light or far field light is transmitted to an information storage medium by the solid immersion lens unit based on whether the information storage medium is the information storage medium using near field light or the information storage medium using far field light, the effective beam-size controlling device being disposed between the first light source and the solid immersion lens; and
- a focal point adjusting optical system configured to adjust a focal position of light transmitted to the information storage medium according to whether the information storage medium is the information storage medium using near field light or the information storage medium using far field light, the focal point adjusting optical system being disposed between the effective beam-size controlling device and the solid immersion lens.

18. The compatible near field optical recording/reproducing apparatus of claim 17, wherein the focal point adjusting optical system comprises at least two relay lenses disposed in tandem, the at least two relay lenses being configured to drive at least one of the at least two relay lenses to adjust a focal position of light.

19. The compatible near field optical recording/reproducing apparatus of claim 18, wherein:
- light incident from the first light source is focused by a first one of the at least two relay lenses;
- the focused light is divergently emitted from a position of the first one of the least two relay lenses through which the focused light was focused; and
- the divergently emitted light is incident onto and condensed by a second one of the at least two relay lenses.

20. The compatible near field optical recording/reproducing apparatus of claim 17, wherein the effective beam size-controlling device comprises one of a passive diffractive optical element and an active liquid crystal device.

* * * * *